United States Patent
Touze et al.

(10) Patent No.: US 9,554,056 B2
(45) Date of Patent: Jan. 24, 2017

(54) METHOD OF AND DEVICE FOR ENCODING AN HDR IMAGE, METHOD OF AND DEVICE FOR RECONSTRUCTING AN HDR IMAGE AND NON-TRANSITORY STORAGE MEDIUM

(75) Inventors: David Touze, Cesson Sevigne (FR); Yannick Olivier, Cesson Sevigne (FR); Philippe Bordes, Cesson Sevigne (FR); Dominique Thoreau, Cesson Sevigne (FR); Joan Llach, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 984 days.

(21) Appl. No.: 13/618,403

(22) Filed: Sep. 14, 2012

(65) Prior Publication Data

US 2013/0083838 A1    Apr. 4, 2013

(30) Foreign Application Priority Data

Oct. 4, 2011   (EP) .................................. 11306281

(51) Int. Cl.
*H04N 7/12*   (2006.01)
*H04N 5/235*   (2006.01)
(Continued)

(52) U.S. Cl.
CPC .......... *H04N 5/2355* (2013.01); *H04N 5/2356* (2013.01); *H04N 5/355* (2013.01);
(Continued)

(58) Field of Classification Search
CPC ...... H04N 5/2355; H04N 19/33; H04N 19/46; H04N 19/59; H04N 19/70; H04N 19/98; H04N 5/2356; H04N 5/355; H04N 5/3456
(Continued)

(56) References Cited

U.S. PATENT DOCUMENTS

2003/0142745 A1*  7/2003  Osawa ................. H04N 5/2355
                                                               375/240.03
2007/0285526 A1* 12/2007  Mann ................. H04N 5/23245
                                                                 348/222.1
(Continued)

FOREIGN PATENT DOCUMENTS

DE             19619598          11/1997
WO       WO2005104035           11/2005
(Continued)

OTHER PUBLICATIONS

Vetro ("Overview of the Stereo Multiview Video Coding Extensions of the H.264/MPEG-4 AVC Standard," Proceedings of the IEEE, vol. 99, No. 4, Apr. 2011).*

(Continued)

*Primary Examiner* — Gims Philippe
*Assistant Examiner* — Benjamin Pezzner
(74) *Attorney, Agent, or Firm* — Tutunjian & Bitetto, P.C.

(57) ABSTRACT

The invention is made in the field of coding of images of high dynamic range.
The invention is based on the concept of Frame Compatible format. The idea is to transport, in a frame, down-sampled LDR content together with additional information allowing reconstructing HDR content from the LDR content.
Thus, it is proposed a method of encoding an HDR image of high dynamic range according to claim 1. Said method comprises down-sampling (DWN) an LDR image and additional data, the LDR image providing a lower dynamic range depiction of the HDR image content and the additional data allowing for reconstructing the HDR image from the LDR image.

12 Claims, 14 Drawing Sheets

(51) Int. Cl.
  *H04N 5/355* (2011.01)
  *H04N 19/70* (2014.01)
  *H04N 19/46* (2014.01)
  *H04N 19/33* (2014.01)
  *H04N 19/98* (2014.01)
  *H04N 19/59* (2014.01)
  *H04N 5/345* (2011.01)

(52) U.S. Cl.
  CPC ............ *H04N 19/33* (2014.11); *H04N 19/46* (2014.11); *H04N 19/59* (2014.11); *H04N 19/70* (2014.11); *H04N 19/98* (2014.11); *H04N 5/3456* (2013.01)

(58) Field of Classification Search
  USPC .................................................... 375/240.01
  See application file for complete search history.

(56) References Cited

U.S. PATENT DOCUMENTS

2010/0283861 A1  11/2010  Tamagawa
2011/0211732 A1* 9/2011  Rapaport ............. G06F 3/1454
                                                 382/107

FOREIGN PATENT DOCUMENTS

WO  WO 2005104035 A1 * 11/2005 ............ G06T 5/009
WO  WO2010046362        4/2010
WO  WO2010085361        7/2010

OTHER PUBLICATIONS

Ward et al., "JPEG-HDR: A Backwards-Compatable, High Dynamic Range Extension to JPEG", Proceedings of the Annual ACM Symposium on the Theory of Computing, Jan. 1, 2005, pp. 283-290.
The European Search Report dated Mar. 26, 2012.
Vetro et al., "Overview of the Stereo and Multiview Video Coding Extensions of the H.264 MPEG-4 AVC Standard", Proceedings of the IEEE, vol. 99, No. 4, Apr. 2011, pp. 626-642.
Vetro, "Frame Compatible Formats for 3D Video Distribution", 2010 Proceedings of 17th IEEE International Conference on Image Processing (ICIP 2010), Sep. 26, 2010, Hong Kong, pp. 2405-2408.
Mantiuk et al., "Backward Compatible High Dynamic Range MPEG Video Compression", Proceedings of SIGGRAPH '06 (Special issue of ACM Transactions on Graphics), vol. 25, No. 3, 2006, pp. 713-723.
Motra et al., "An Adaptive LogLuv Transform for High Dynamic Range Video Compression", Proceedings of 2010 IEEE 17th International Conference on Image Processing, Sep. 26, 2010, Hong Kong, pp. 2061-2064.
Alexis Michael Tourapis et al., H.264/14496-10 AVC Reference Software Manual, Dolby Laboratories Inc., Fraunhofer-Institute HHI, Microsoft Corporation, (Jan. 2009).

* cited by examiner

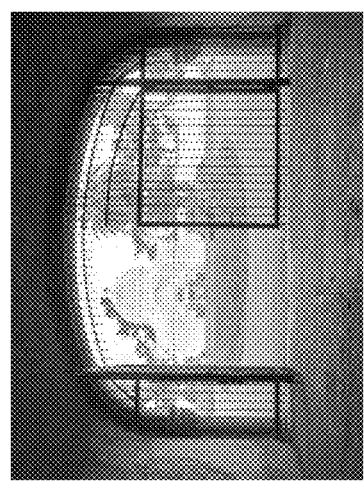
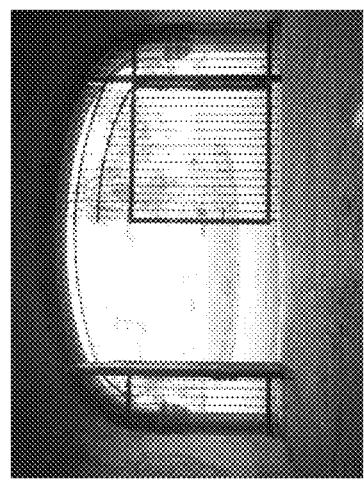
Fig. 2

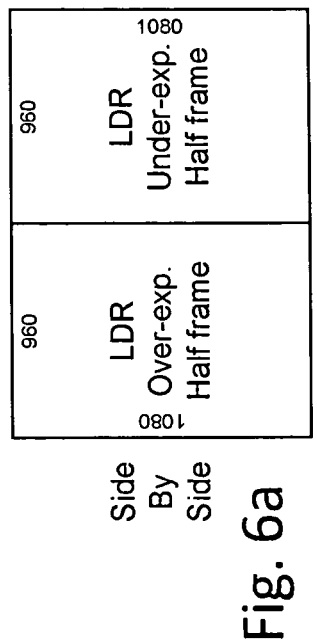 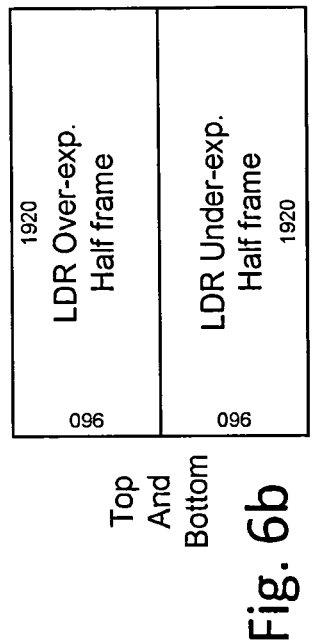
Fig. 6a  Side By Side
Fig. 6b  Top And Bottom

Fig. 10a
Side By Side

LDR Half frame (960 × 1080)
Exposure map Half frame (960 × 1080)

Fig. 10b
Top And Bottom

LDR Half frame (1920 × 960)
Exposure map Half frame (1920 × 960)

Fig. 11a
Side By Side

LDR Half frame (960 × 1080)
LDR Over-exp. Quarter frame (960 × 540)
LDR Under-exp. Quarter frame (960 × 540)

Fig. 11b
Top And Bottom

LDR Half frame (1920 × 540)
LDR Over-exp. Quarter frame (960 × 540)
LDR Under-exp. Quarter frame (960 × 540)

METHOD OF AND DEVICE FOR ENCODING AN HDR IMAGE, METHOD OF AND DEVICE FOR RECONSTRUCTING AN HDR IMAGE AND NON-TRANSITORY STORAGE MEDIUM

This application claims the benefit, under 35 U.S.C. §119 of EP Patent Application 11306281.4, filed 4 Oct. 2011.

FIELD OF THE INVENTION

The invention is made in the field of coding of images of high dynamic range.

BACKGROUND OF THE INVENTION

Images, whether still images or image frames of an image sequence, are generally represented on a limited number of bits (for instance 8, 10, 12 or more bits), corresponding to a limited range of values to represent the luminance signal. Images represented in such way are called images of low dynamic range or, shortly, LDR images. However the human visual system is able to perceive a wider range of luminance. The limited representation most often does not allow for reconstructing correctly small signal variations, in particular in image areas of extremely dark or bright luminance. The HDR (High Dynamic Range) format consists in significantly extending bit-depth of signal representation to integer representation with more bits e.g. 20 to 64 bits, or even to floating representation, in order to keep a high accuracy of the signal on its entire luminance range.

HDR images can be captured in various ways. For instance, Digital Single Lens Reflex cameras can use bracketing technique to capture successive images of the same scene with different exposures wherein exposure is the total density of light allowed to fall on the imaging medium (photographic film or image sensor) during the process of taking an image. Those images of different exposures are represented as LDR images. Under-exposed images capture details in the bright areas whereas over-exposed images capture details in the dark areas, as exemplarily depicted in FIG. 1 for different exposure values EV.

By fusion of these differently exposed LDR images an HDR image can be produced with a floating point representation, the produced HDR image containing all details those in dark areas as well as those in bright areas.

An HDR image cannot be used in its source format with devices designated for use with LDR images, e.g. set-top-boxes, PVR, and legacy displays. Anyway, a process called Tone Mapping, allows representing the image while ensuring a good restitution of the different signal intensity segments, in particular, in dark and bright intensity ranges. Tone Mapping creates, from an HDR image, a LDR image where all the elements are correctly exposed. The LDR image is much more detailed both in dark areas and in white areas. This is exemplarily depicted in FIG. 2.

HDR is used, in particular, in post-production. All special effects tools are dealing with HDR images with a floating point representation. The mixing being natural scene and special effects is also realized in HDR representation. At the end of the post-production process Tone Mapping is applied to create a standard 8/10/12-bit master under the control of the Director of Photography.

Mantiuk et. al.: "Backward Compatible High Dynamic Range MPEG Video Compression", Proc. of SIGGRAPH '06 (Special issue of ACM Transactions on Graphics), 25 (3), pp. 713-723, 2006, propose a backward-compatible HDR video compression (HDR MPEG) method which introduces a compact reconstruction function that is used to decompose an HDR video stream into a residual stream and a standard LDR stream, which can be played on existing MPEG decoders, such as DVD players. Mantiuk's residual stream creates about 30% bitstream overhead compared to the LDR stream only.

Motra and Thoma: "An Adaptive LogLuv Transform for High Dynamic Range Video Compression", Proceedings of 2010 IEEE 17th International Conference on Image Processing, September 2010, Hong Kong, describe an approach of how an existing encoder can be used for encoding HDR video sequence with an adaptive LogLuv transform proposed by the authors. Motra and Thoma further describe using the high bit depth profile of MPEG AVC to encode those data.

SUMMARY OF THE INVENTION

One drawback of the methods mentioned afore is the non retro-compatibility with standard HDTV eco system.

The inventors realized that there is a need in the art for an alternative encoding scheme for HDR images and videos that allows for reusing already deployed image/video encoders and that is backward-compatible with standard LDR HDTV.

The invention is based on the concept of Frame Compatible format. The idea is to use the Frame Compatible method to transport down-sampled LDR content together with additional information allowing reconstructing HDR content from the LDR content. At decoder side, the LDR content can be used to source LDR displays and the HDR content can thus be reconstructed and used to source HDR displays. Or the HDR content reconstruction is tone mapped to be used by LDR displays.

Thus, it is proposed a method of encoding an HDR image of high dynamic range according to claim 1. Said method comprises down-sampling an LDR image and additional data, the LDR image providing a lower dynamic range depiction of the HDR image content and the additional data allowing for reconstructing the HDR image from the LDR image. Said method further comprises arranging, in a frame, the down-sampled LDR image and the down-sampled additional data.

It is further proposed a method of reconstructing an HDR image of high dynamic range according to claim 2. Said further proposed method comprises decoding a frame, splitting the frame into a down-sampled LDR image and down-sampled additional data, the LDR image providing a down-sampled lower dynamic range depiction of the HDR image content and the additional data allowing for reconstructing the HDR image from the LDR image, up-sampling the down-sampled LDR image and the down-sampled additional data and reconstructing the HDR image from the up-sampled LDR image using the up-sampled additional data.

And, it is proposed a storage medium carrying an encoded frame comprising a down-sampled LDR image of low dynamic range and down-sampled additional information, the additional data allowing for reconstructing an HDR image providing a higher dynamic range depiction of the LDR image content.

Furthermore, the inventors propose a device for encoding an HDR image of high dynamic range, the encoding device being in accordance with claim 11, and a device for reconstructing an HDR image of high dynamic range, the encoding device being in accordance with claim 14.

In an embodiment, the frame is encoded in a base layer and information removed by down-sampling the LDR image and/or the additional data is encoded in an enhancement layer.

In further embodiments, down- and up-sampling occurs in a sampling direction, for instance, in a horizontal, diagonal or vertical sampling direction. Corresponding to the sampling direction, there is an arrangement pattern, e.g. side-by-side arrangement corresponds to horizontal sampling and top-and-bottom corresponds to vertical down- and up-sampling.

The features of further advantageous embodiments are specified in the dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not for limiting the invention's disclosure or scope defined in the claims.

FIG. 2 depicts an exemplary image where tone mapping has been applied to bright areas;

FIG. 6 depicts two possible frame structures of a first exemplary embodiment;

FIG. 10 depicts two possible frame structures of the second exemplary embodiment;

FIG. 11 depicts two possible frame structures of a third exemplary embodiment;

DETAILED DESCRIPTION OF THE INVENTION

The invention may be realized on any electronic device comprising a processing device correspondingly adapted. For instance, the invention may be realized in television, in a media gateway, a set top box, in a mobile phone, a personal computer, a digital still camera, a digital video camera or a car entertainment system, wherein each of these exemplary systems can be configured for processing image content with a low dynamic range, with a high dynamic range or both. The invention can be applied to HDR still images as well as HDR video/HDR image sequences.

A first exemplary embodiment of the invention exploits the fact that an image of high dynamic range can be generated from aligned images of different exposures, e.g. a pair of images of a same scene taken from a same viewpoint wherein one of the images is under-exposed and the other is over-exposed.

Figure 1:
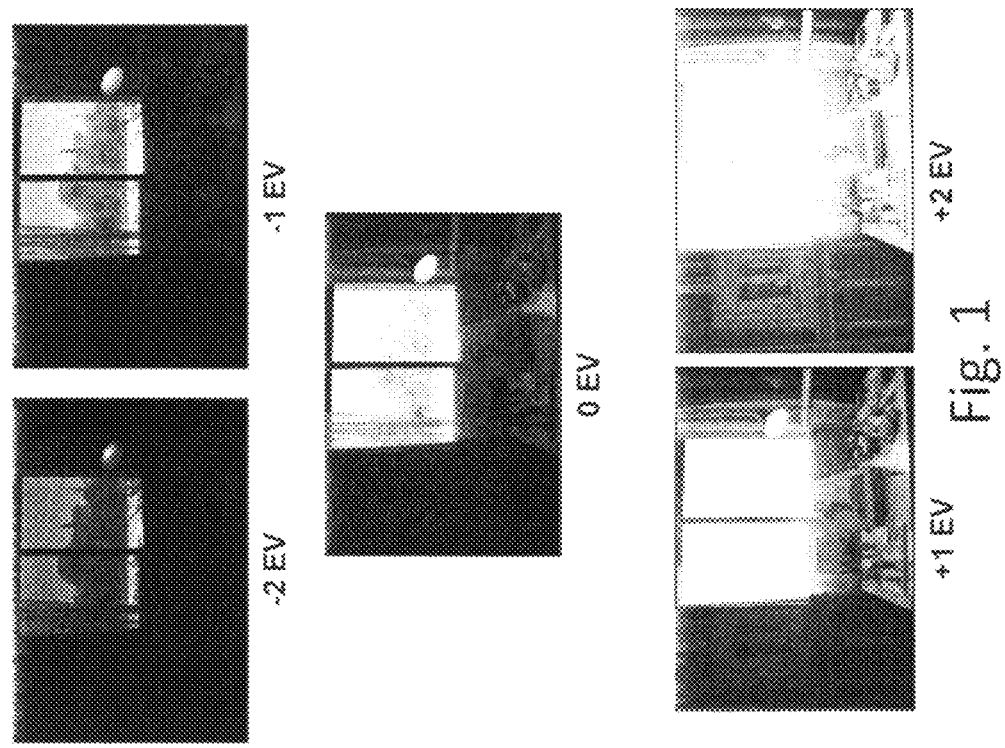
FIG. 1 depicts an exemplary series of a same view of a same scene with different exposures.
Figure 3:
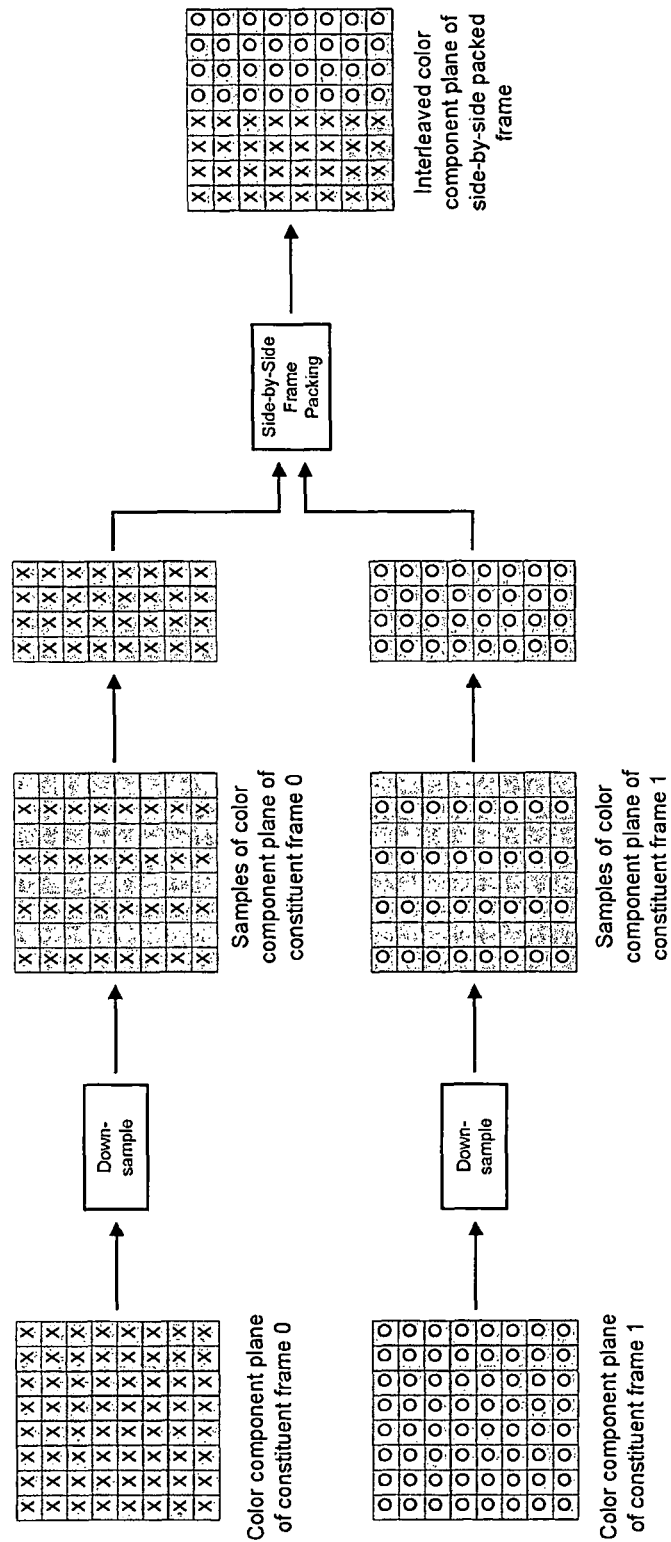
FIG. 3 exemplarily depicts side-by-side down-sampling and packing at the encoding side of the first and a second exemplary embodiment.
Figure 4:
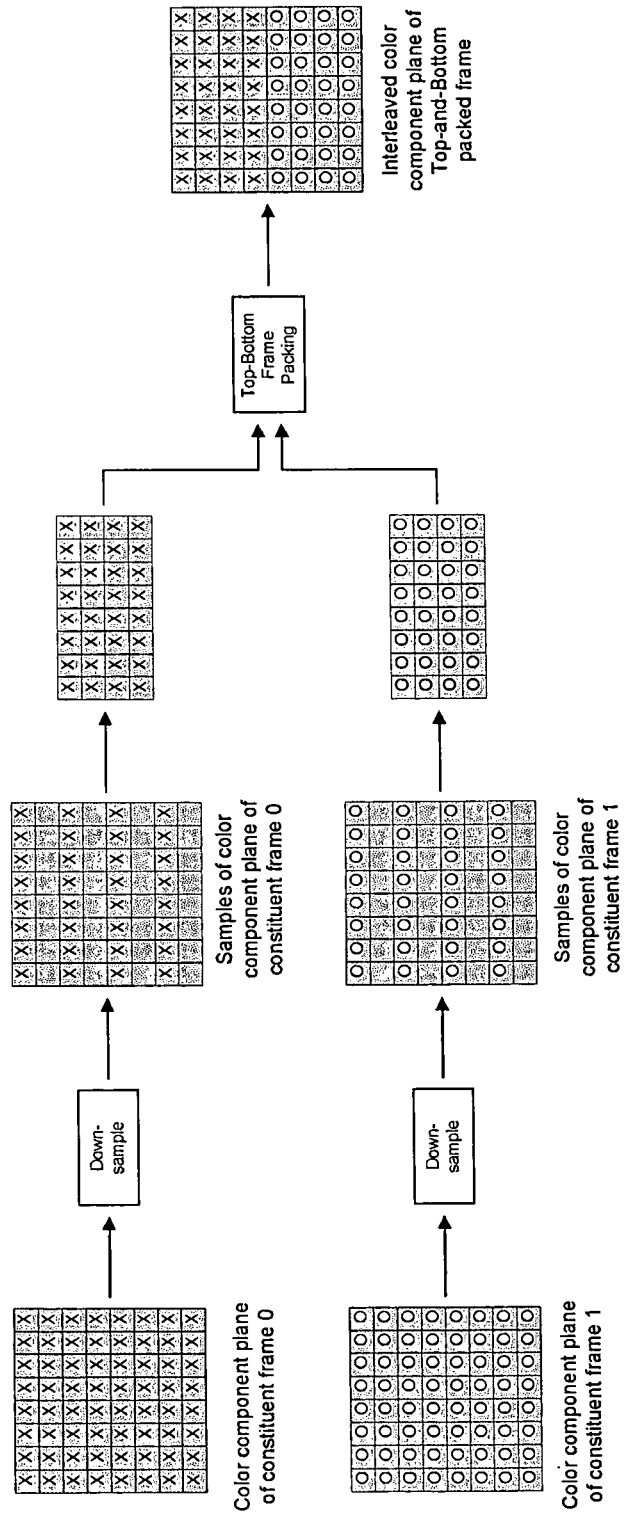
FIG. 4 exemplarily depicts top-and-bottom down-sampling and packing at the encoding side of the first and a second exemplary embodiment.

In order to fit the pair of images in a single frame, the images are down-sampled. In the first exemplary embodiment, down-sampling can be horizontally, i.e. every odd or every even column is removed as exemplarily depicted in FIG. 3, or vertically, i.e. every odd or every even row is removed as exemplarily depicted in FIG. 4. The down-sampled images then can be arranged in a single frame. The arrangement is side-by-side in case of horizontal down-sampling and top-and-bottom in case of vertical down-sampling. This is exemplarily depicted in FIG. 5. The depicted exemplarily two LDR images have 1080 rows and 1920 columns and are down-sampled horizontally to 960 columns and arranged side-by-side as depicted in FIG. 6a or down-sampled vertically to 540 rows and arranged top and bottom as depicted in FIG. 6b.

Other sampling directions are possible, e.g. diagonally inclining or diagonally declining. The sampling direction can be fixed or can be selected adaptive to content preservation. For instance, several sampling directions can be tested, per image or per group of pictures, at encoder side and the one leading to best rate-distortion is selected, for instance. The arrangement type can be signalled in metadata or determined by searching, in the frame, for features of edges halving the frame. The significance of the features can be compared and the most significant one of can then be used for splitting the frame into the images again.

Similarly, whether odd or even lines orthogonal to said sampling direction are removed can be fixed or adjusted for both images in common or individually, for instance for improving rate-distortion. This adjustment can occur independently from an adaptation of the sampling direction, e.g. even in case of a fixed sampling direction, or, in coherence with the sampling direction adaptation.

After arrangement in the frame, the frame is encoded. In case of the LDR images belonging to a sequence of LDR image pairs suitable for reconstructing a HDR video thereof, the frame can be encoded according to any known video coding standard, e.g. H.264/MPEG-4 AVC. For the gist of the invention it is of no importance which coding standard is used.

The encoding can make use of the fact that the two LDR images show same content with different exposure. That is, motion vector search can be restricted to one half of the frame and motion vectors determined on one half-frame can be re-used on the other half-frame. Re-use can even be made mandatory in which case only motion vectors of one half-frame need to be encoded.

Optionally, the encoder outputs a base layer of a scalable image/video coding (SVC) format and the rows or columns omitted in the down-sampled LDR images are encoded in an enhancement layer of the SVC format. Or, the encoder outputs a first view of a multi-view coding (MVC) format and the rows or columns omitted in the down-sampled LDR images are encoded in a second view of the MVC format.

In order to improve the exposures of the two LDR images in a way which preserves details in normally exposed areas of each the two LDR images, an optional histogram alignment can be applied, before or after down-sampling. Specific settings of the histogram adjustment can be fixed or adapted in which case they can be sent to the decoding process via metadata, so that the decoder is able to perform the inverse transform.

Figure 5:
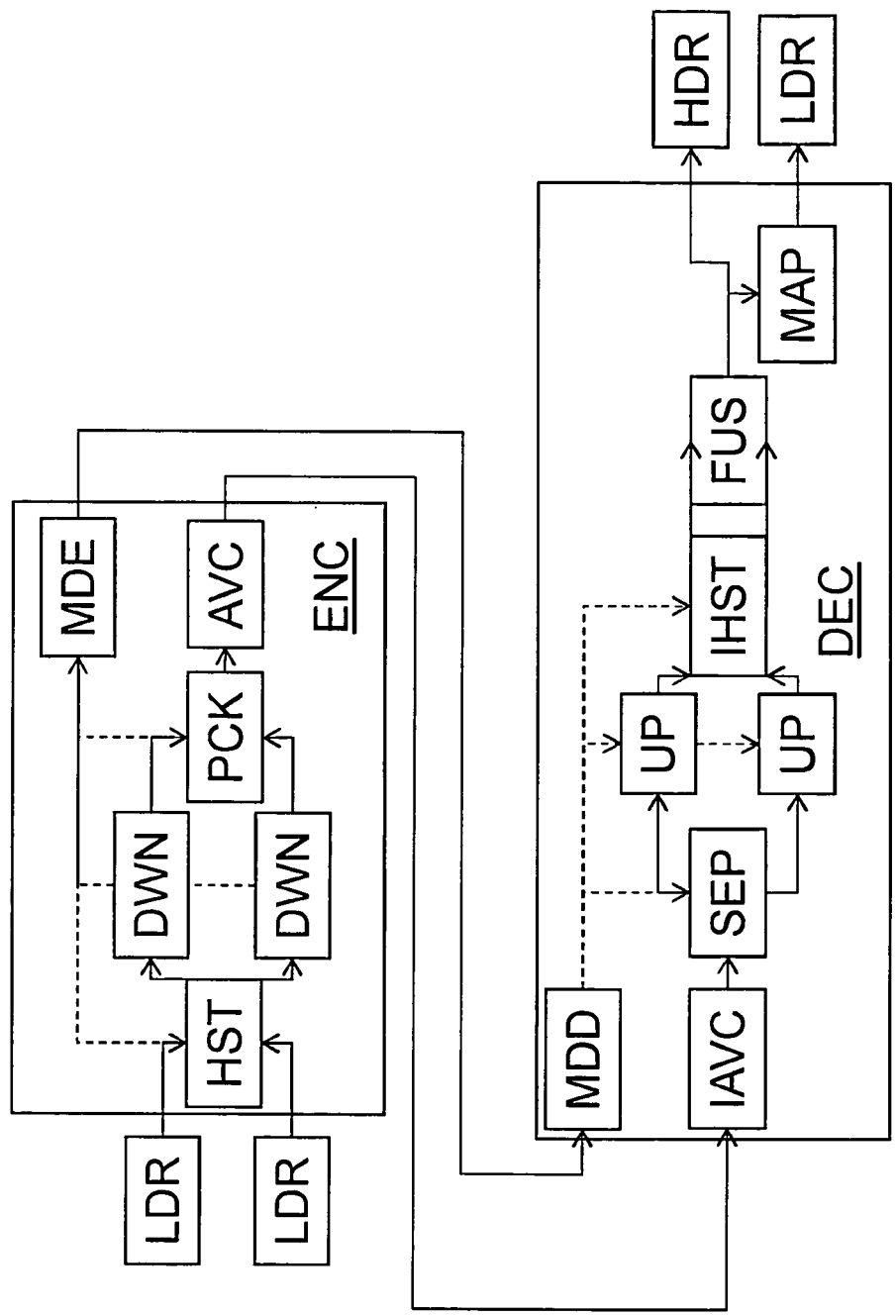
FIG. 5 depicts a coding framework of the first exemplary embodiment.

An exemplary coding framework based on two differently exposed LDR images is depicted in FIG. 5.

An encoding device ENC receives two differently exposed, aligned images or video frames with low dynamic range and adjusts their exposure by histogram equalization in module HST. Then, the exposure adjusted images are down-sampled DWN and packed PCK into a single frame which is encoded by an H.264/MPEG-4 AVC encoder AVC. Module MDE encodes parameter of the histogram alignment, information about the down-sampling and information about the packing into metadata of the frame. The encoded frame including the metadata is then output for transmission in a stream or storage on a storage medium, e.g. an optical disk.

Figure 7:
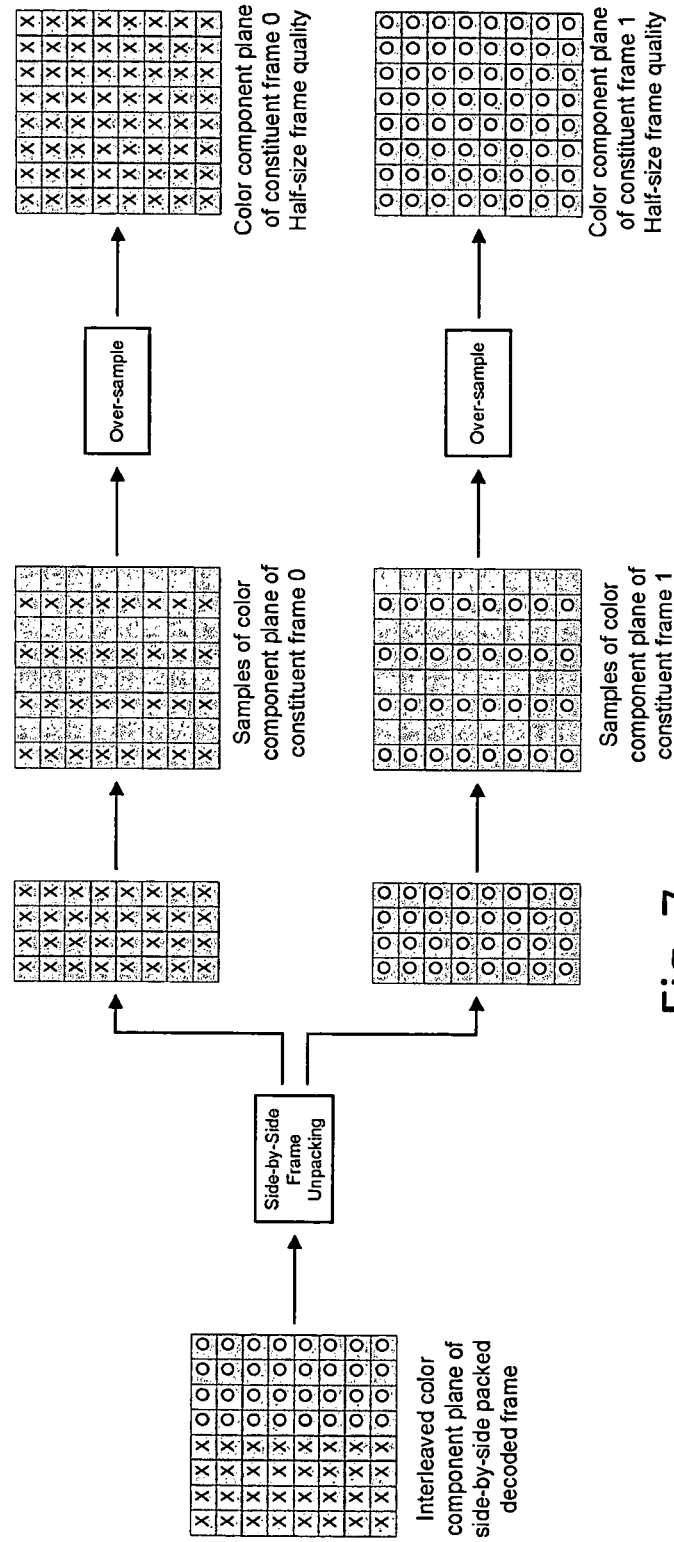
FIG. 7 exemplarily depicts side-by-side de-packing and up-sampling at the decoding side of the first and a second exemplary embodiment.
Figure 8:
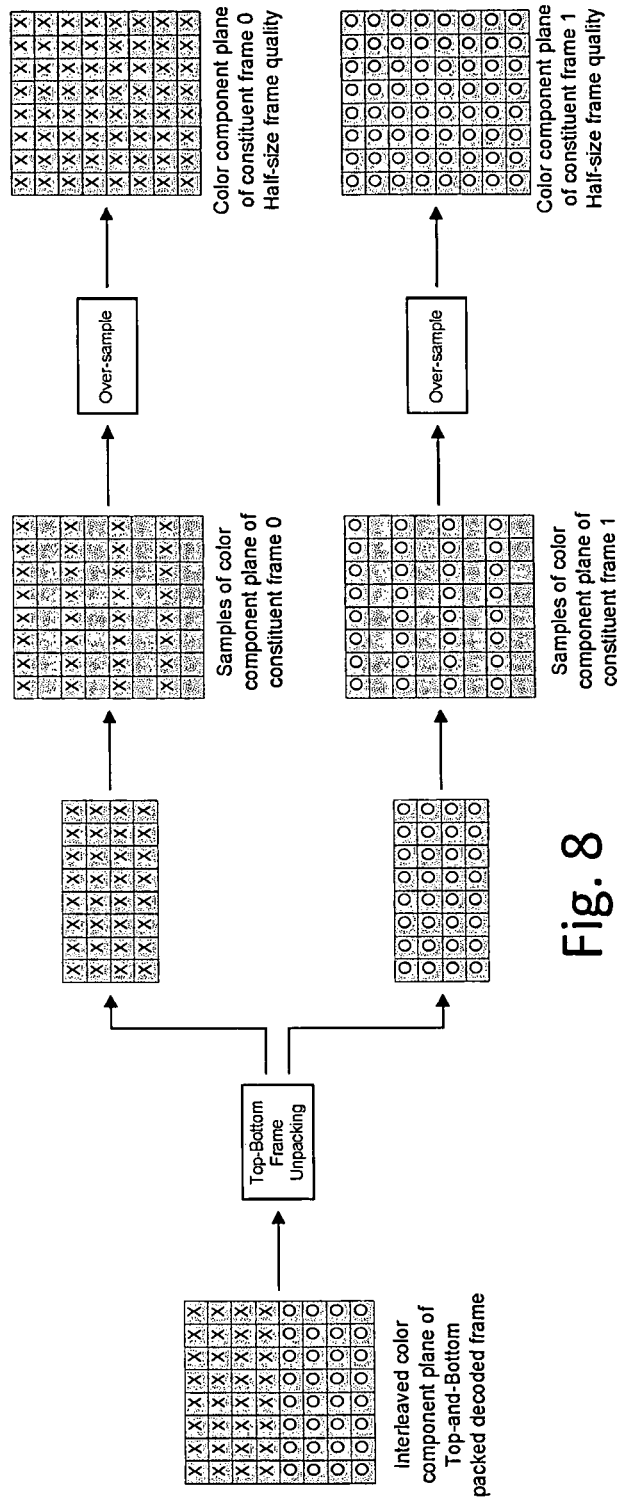
FIG. 8 exemplarily depicts top-and-bottom de-packing and up-sampling at the decoding side of the first and a second exemplary embodiment.

A decoding device DEC receives the encoded frame including the metadata from a device for reading the storage medium or from a stream receiving device and decodes IAVC the frame according to the standard used for encoding. Then, the metadata is decoded MDD and used for splitting SEP the frames into the down-sampled LDR images. The metadata is further used whether up-sampling UP is to add odd or even lines. The splitting and up-sampling is exemplarily depicted, in FIG. 7, for side-by-side arranged LDR images and, in FIG. 8, for top-and-bottom arranged LDR images. Next, metadata of the histogram alignment parameters is used for reversing histogram alignment IHST. After reverse alignment, fusing FUS the LDR images generates the HDR content.

The HDR content then can be output as-is for sourcing an HDR display or output tone mapped MAP for sourcing an LDR display.

Figure 9:
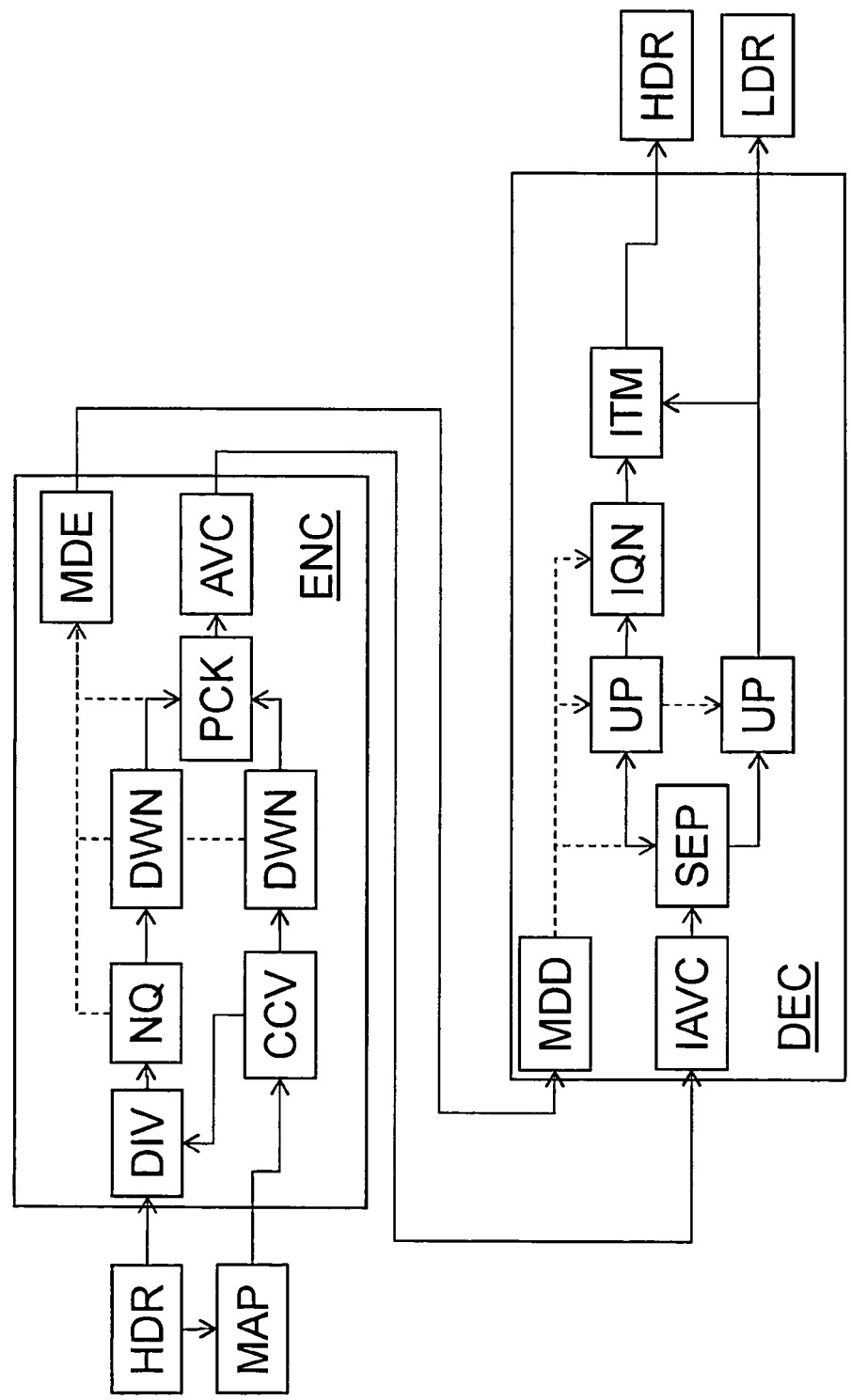
FIG. 9 depicts a coding framework of the second embodiment.

In a second exemplary embodiment depicted in FIG. 9, the encoding device ENC is sourced with HDR content in red-green-blue (RGB) colour space. The content is tone mapped MAP for generating LDR content in RGB. The LDR content is colour converted CCV into a luminance-chrominance space, for instance YUV 420, and luminance values of HDR content are determined. In turn these values are used to extract an exposure map from the HDR content, e.g. by pixel-wise division DIV of the luminance values of HDR content by those of the LDR content. This requires transformation into a luminance-chrominance can be done using, e.g., logarithmic scaling or linear scaling. The exposure map then is normalized and quantized NQ to the bit depth allowed by the format. For taking advantage of encoding being YUV 420 frame optimized, the normalized and quantized exposure map is transformed from YUV 400 space into YUV 420 space.

Then, the transformed exposure map and the LDR content are down-sampled DWN and packed PCK into one frame, either side-by side as exemplarily depicted in FIG. 10*a*, or top-and-bottom as exemplarily depicted in FIG. 10*b*. The frame is subsequently AVC encoded. Down-sampling can be horizontal or vertical and either odd or even lines can be removed and/or information removed due to down-sampling can be conveyed in an enhancement layer of SVC or in a different view of MVC.

In this second exemplary embodiment exemplarily depicted in FIG. 9, the metadata comprise, besides the information on whether odd or even lines are removed, extreme values of the luminance ratio used for normalization. Information about the arrangement, e.g. side-by-side or top-and-bottom, can be comprised, too, or can be determined at decoder side using frame-halving edge feature detection.

The decoder DEC decodes IAVC the encoded frame and splits SEP into the down-sampled tone-mapped LDR content and the down-sampled exposure map. By, up-sampling UP, LDR content and exposure map are expanded to frame size again.

The up-sampled LDR content can be output as-is to an LDR capable device. The exposure map can be de-quantized and de-normalized IQN using minimum and maximum luminance values conveyed as metadata. The expanded exposure map then can be used for inverse tone mapping ITM and the resulting HDR content can source a HDR capable display.

A third exemplary embodiment of the invention also exploits the fact that an image of high dynamic range can be generated from aligned images of different exposures, e.g. three images of a same scene taken from a same viewpoint wherein one of the images is under-exposed, one is normally exposed and one is over-exposed.

Figure 12:
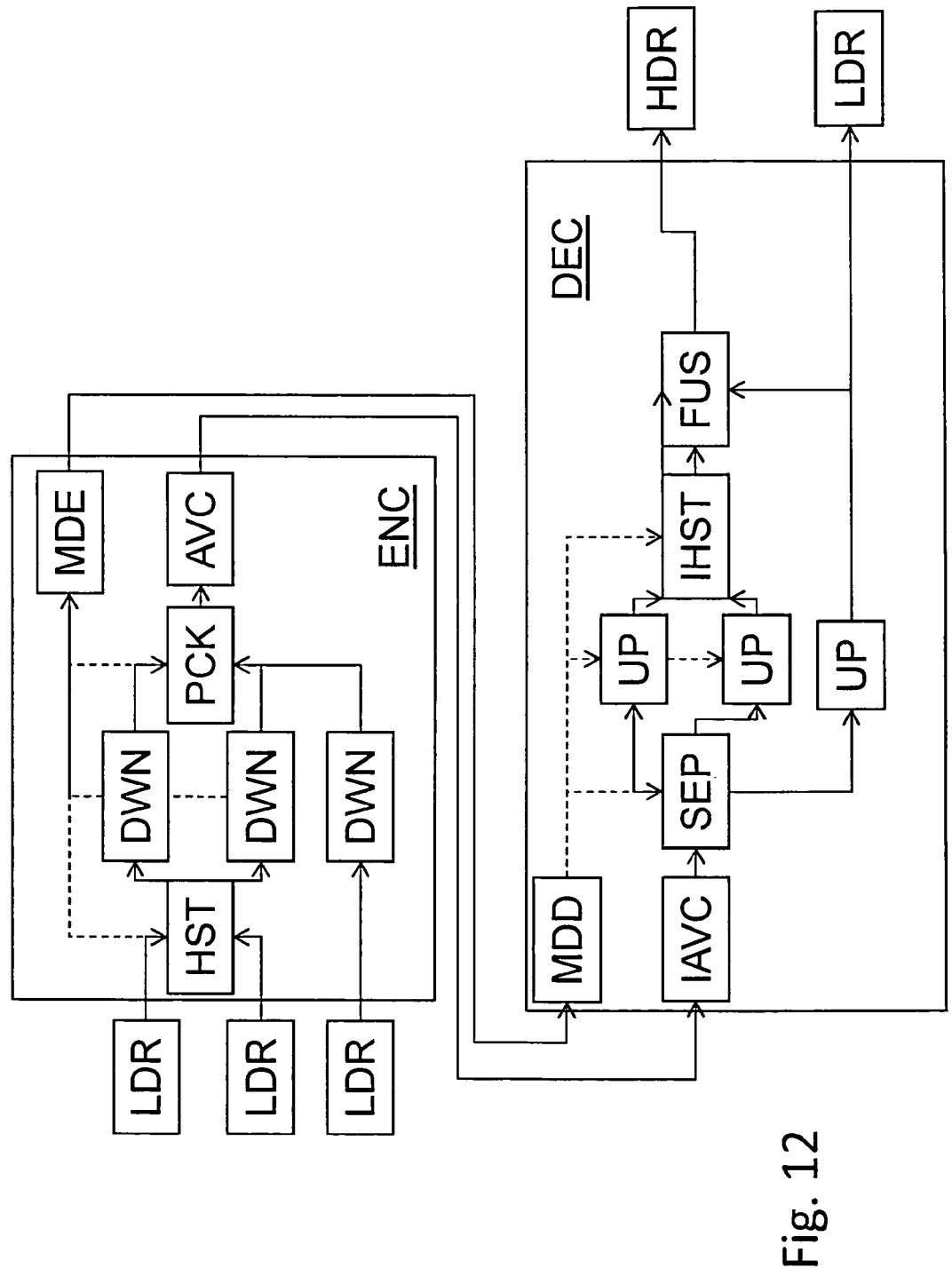
FIG. 12 depicts a coding framework of the third exemplary embodiment.

In the third embodiment depicted in FIG. 12, the not normally exposed of the aligned images are down-sampled horizontally and vertically. Optionally, histogram alignment is applied prior to down-sampling. The normally exposed LDR image is down-sampled either vertically or horizontally without histogram alignment. Then the three images are arranged in the frame as exemplarily depicted in FIG. 11*a* or FIG. 11*b*.

That is, in case the normally exposed LDR image is vertically down-sampled, the down-sampled non-normally exposed images are arranged side-by-side and the down-sampled normally exposed image is arranged below or atop thereof. And in case the normally exposed LDR image is horizontally down-sampled, the down-sampled non normally exposed images are arranged top-and-bottom and the down-sampled normally exposed image is arranged side-by-side thereto. The resulting frame is then encoded, e.g. using an AVC encoder. Metadata of the frame can carry information on parity of the lines removed, direction of down-sampling of the normally exposed image and/or parameters of histogram alignment.

At the decoder side the stream is first decoded using standard video coder as AVC for instance. The frame is then unpacked using the according method carried by the metadata or using a detected vertical or horizontal middle edge. The normally exposed of the resulting images or image streams is then over-sampled using the according method carried by the metadata, producing the reconstructed normally exposed LDR image/video. The over-exposed LDR video and the under-exposed LDR video are over-sampled vertically and horizontally.

The resulting normally exposed LDR content can directly source a LDR display.

In case histogram alignment has been applied at encoder side, the inverse histogram adjustment can be optionally applied to the over-exposed and under-exposed content, using the parameters being carried by metadata.

The resulting normally exposed LDR content can further be fused with the inverse histogram aligned over-exposed LDR content and the under-exposed LDR content for reconstructing the HDR content which than can be provided to an HDR display.

Figure 13:
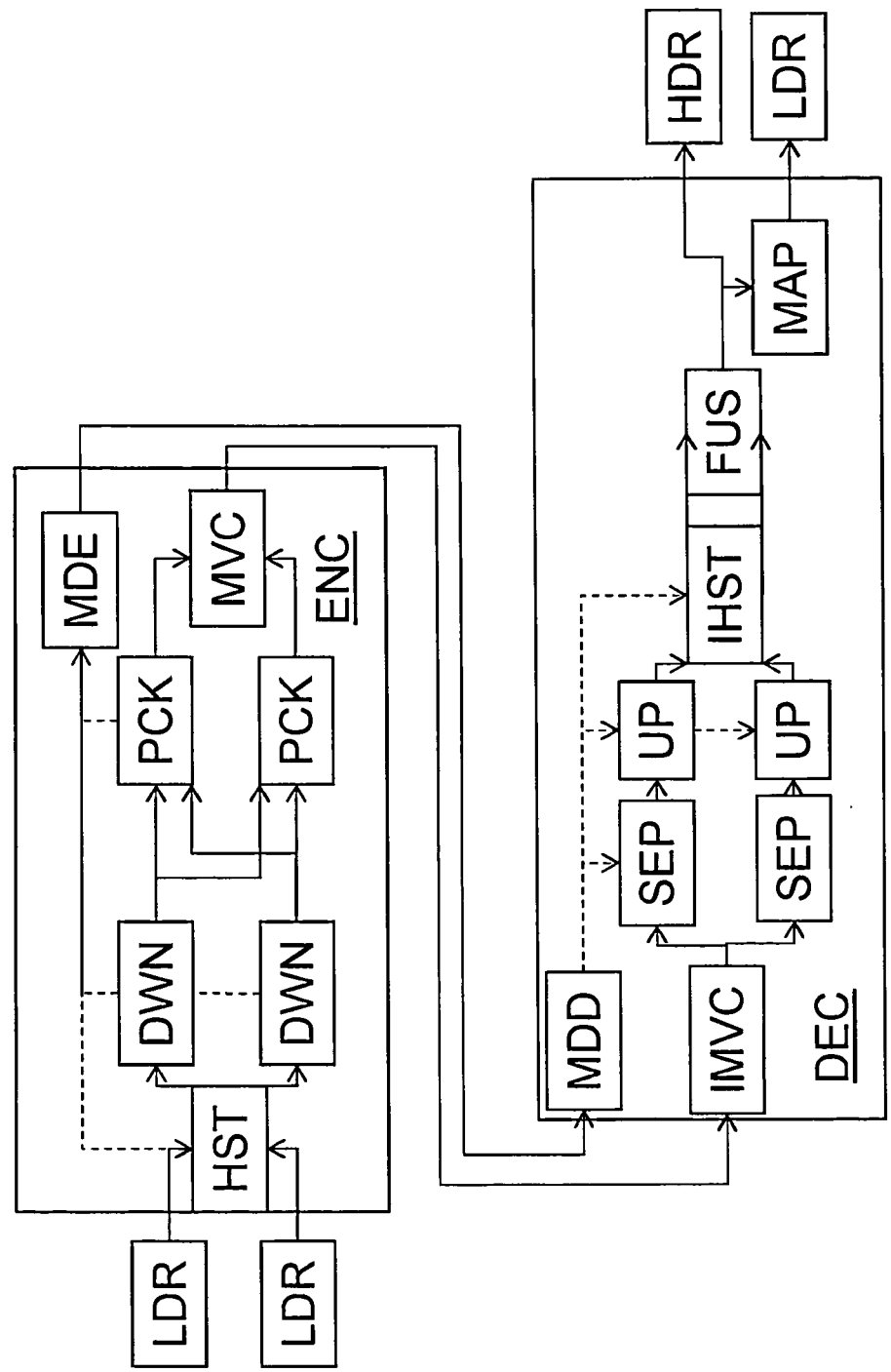
FIG. 13 depicts a further coding framework of the first exemplary embodiment based on multi-view coding with an MVC compatible decoding device.
Figure 14:
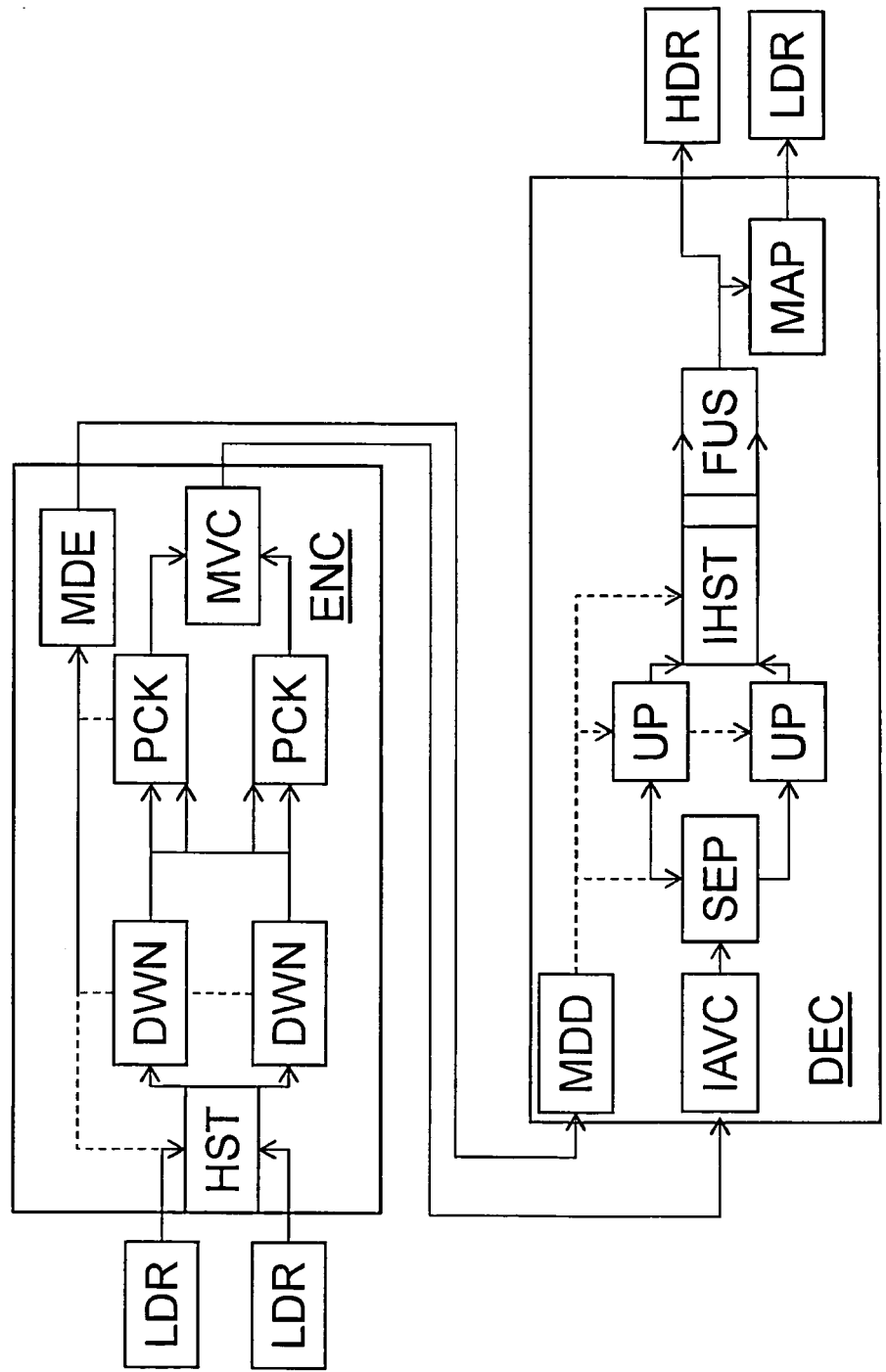
FIG. 14 depicts a further coding framework of the first exemplary embodiment based on multi-view coding with a not MVC compatible decoding device.
Figure 15:
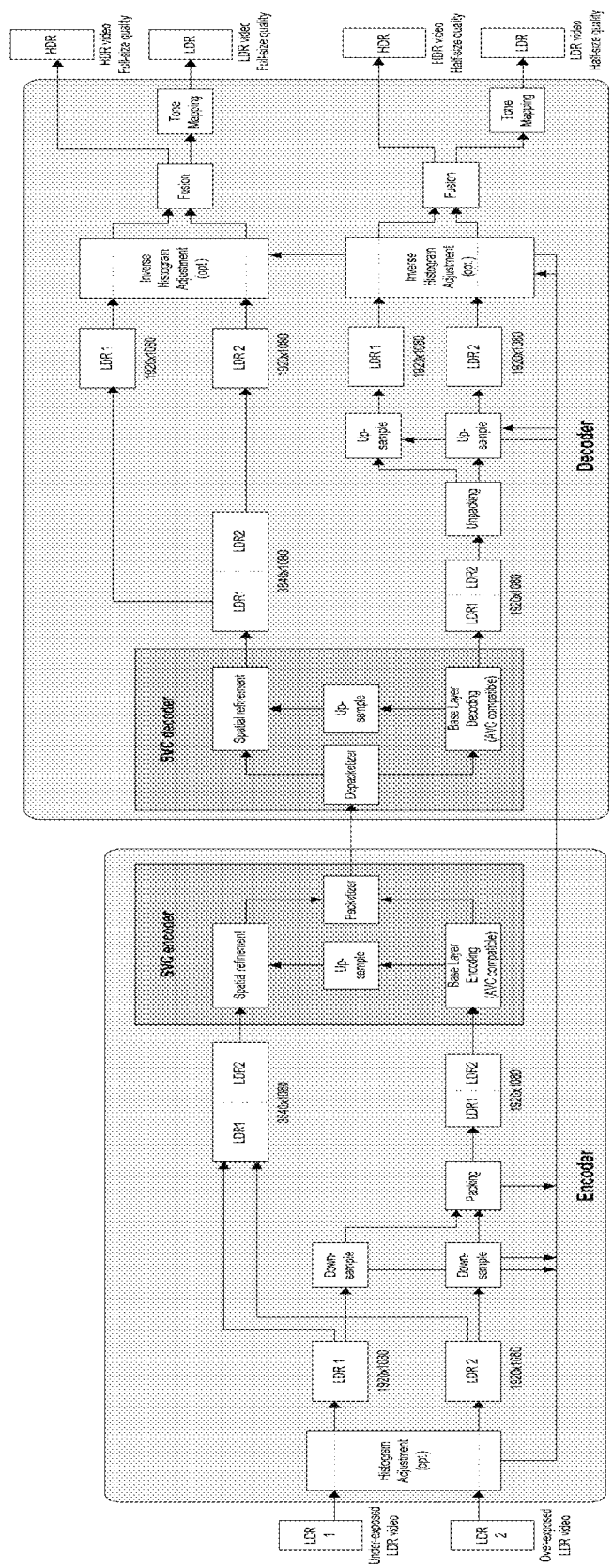
FIG. 15 depicts a yet further coding framework of the first exemplary embodiment based on scalable video coding.

In the third exemplary embodiment as well as in the first and second exemplary embodiment, the frame can be encoded in a base layer of a scalable video coding format, too (FIG. 15). Or, MVC (FIGS. 13 and 14) can be used. Then, the information lacking in the base layer/primary view due to down-sampling can be encoded in one or more enhancement layers/secondary views. In every case where this principle of distributing information on different views or layers is applied, motion vector information of a half-frame of the base layer/first view not only can be re-used for the other half-frame of the base layer/first view, but also for the half-frames of the enhancement layer.

For instance, if HDR content is based on four images of different exposure pixels of each the four LDR images can be sorted into four LDR sub-images of quarter resolution. For instance, odd pixels in odd rows are sorted into a first sub-image, odd pixels in even rows are sorted into a second sub-image, even pixels in odd rows are sorted into a third sub-image and even pixels in even rows are sorted into a fourth sub-image. Then, the first sub-images of the four LDR images are arranged in an SVC base layer or a primary MVC view, the second sub-images of the four LDR images are arranged in first SVC enhancement layer or a first secondary MVC view, the third sub-images of the four LDR images are arranged in second SVC enhancement layer/second secondary MVC view and the fourth sub-images of the four LDR images are arranged in third SVC enhancement layer/third secondary MVC view. For encoding the metadata in exemplary embodiments where frame encoding is in accordance with H.264/MPEG-4 AVC, the following exemplary syntax is proposed.

That is, an aspect of the invention relates to proposal of a modified or new SEI message. For instance, as exemplarily depicted in the table 1 below, sei_payload( ) can be modified such that an additional payloadType equal to 45 is defined which triggers access to hdr_frame_compatible_info(payloadSize), exemplarily depicted in Table 2.

TABLE 1

Modified sei_payload( ) Message

| sei_payload( payloadType, payloadSize ) { | C | Descriptor |
|---|---|---|
| if( payloadType  == 0 ) | | |
|   buffering_period( payloadSize ) | 5 | |
| else if( payloadType  == 1 ) | | |
|   pic_timing( payloadSize ) | 5 | |
| else if( payloadType  == 2 ) | | |
| ..... | | |
| else if( payloadType  == 43 ) | | |
|   operation_points_not_present( payloadSize )   /* specified in Annex H */ | 5 | |
| else if( payloadType  == 44 ) | | |
|   base_view_temporal_hrd( payloadSize )   /* specified in Annex H */ | 5 | |
| else if( payloadType  == 45 ) | | |
|   hdr_frame_compatible_info( payloadSize ) | 5 | |
| else | | |
|   reserved_sei_message( payloadSize ) | 5 | |
| if( !byte_aligned( ) ) { | | |
|   bit_equal_to_one   /* equal to 1 */ | 5 | f(1) |
|   while( !byte_aligned( ) ) | | |
|     bit_equal_to_zero   /* equal to 0 */ | 5 | f(1) |
|   } | | |
| } | | |

TABLE 2

HDR Frame compatible information

| hdr_frame_compatible_info( payloadSize ) { | C | Descriptor |
|---|---|---|
|   hdr_frame_compatible_id | 5 | ue(v) |
|   hdr_frame_compatible_cancel_flag | 5 | u(1) |
|   if ( ! hdr_frame_compatible_cancel_flag) { | | |

TABLE 2-continued

HDR Frame compatible information

| hdr_frame_compatible_info( payloadSize ) { | C | Descriptor |
|---|---|---|
|   hdr_frame_packing_arrangement_type | 5 | u(3) |
|   hdr_frame_compatible_type | 5 | u(2) |
|   if( hdr_frame_compatible_type == 0 ) { | | |
|     over_exposed_view_mapping | 5 | u(1) |
|   } | | |
|   if ( hdr_frame_compatible_type == 1 ) { | | |
|     ldr_view_mapping | 5 | u(1) |
|     hdr_luminance_min | 5 | f(16) |
|     hdr_luminance_max | 5 | f(16) |
|     luminance_ratio_scaling_method | 5 | u(2) |
|   } | | |
|   if( hdr_frame_compatible_type == 2) { | | |
|     multi_view_mapping | 5 | u(2) |
|     secondary_down_sample_mapping | 5 | u(1) |
|   } | | |
|   } | | |
| } | | |

The SEI HDR Frame compatible information message informs the decoder that the output decoded picture contains samples of a frame consisting of multiple distinct spatially packed constituent frames using an indicated frame packing arrangement scheme. This information can be used by the decoder to appropriately rearrange the samples and process the samples of the constituent frames appropriately for display or other purposes (which are outside the scope of this Specification).

hdr_frame_compatible_id contains an identifying number that can be used to identify the usage of the HDR frame compatible info SEI message. The value of hdr_frame_compatible_id shall be in the range of 0 to 2^32-2, inclusive.

Values of hdr_frame_compatible_id from 0 to 255 and from 512 to 2^31-1 may be used as determined by the application. Values of hdr_frame_compatible_id from 256 to 511 and from 2^31 to 2^32-2 are reserved for future use by ITU-T|ISO/IEC. Decoders shall ignore (remove from the bitstream and discard) all HDR frame compatible info SEI messages containing a value of hdr_frame_compatible_id in the range of 256 to 511 or in the range of 2^31 to 2^32-2, and bitstreams shall not contain such values.

hdr_frame_compatible_cancel_flag equal to 1 indicates that the HDR frame compatible info SEI message cancels the persistence of any HDR frame compatible info SEI message in output order.

hdr_frame_compatible_cancel_flag equal to 0 indicates that HDR frame compatible info SEI message information follows.

hdr_frame_packing_arrangement_type indicates the type of packing arrangement of the frames as specified in Table 3.

TABLE 3 hdr_frame_packing_arrangement_type
hdr_frame_compatible_type specifies the solution used to transport HDR related information.

| Value | Interpretation |
|---|---|
| 0 | Each component plane of the decoded frames contains a side-by-side packing arrangement of corresponding planes of two constituent frames. Left half-frame is built with the even columns of the corresponding full-frame. Right half-frame is built with the even columns of the corresponding full-frame. |

TABLE 3-continued hdr_frame_packing_arrangement_type
hdr_frame_compatible_type specifies the solution used to
transport HDR related information.

| Value | Interpretation |
|---|---|
| 1 | Each component plane of the decoded frames contains a side-by-side packing arrangement of corresponding planes of two constituent frames.<br>Left half-frame is built with the even columns of the corresponding full-frame.<br>Right half-frame is built with the odd columns of the corresponding full-frame. |
| 2 | Each component plane of the decoded frames contains a side-by-side packing arrangement of corresponding planes of two constituent frames.<br>Left half-frame is built with the odd columns of the corresponding full-frame.<br>Right half-frame is built with the even columns of the corresponding full-frame. |
| 3 | Each component plane of the decoded frames contains a side-by-side packing arrangement of corresponding planes of two constituent frames.<br>Left half-frame is built with the odd columns of the corresponding full-frame.<br>Right half-frame is built with the odd columns of the corresponding full-frame. |
| 4 | Each component plane of the decoded frames contains a top-and-bottom packing arrangement of corresponding planes of two constituent frames.<br>Top half-frame is built with the even lines of the corresponding full-frame.<br>Bottom half-frame is built with the even lines of the corresponding full-frame. |
| 5 | Each component plane of the decoded frames contains a top-and-bottom packing arrangement of corresponding planes of two constituent frames.<br>Top half-frame is built with the even lines of the corresponding full-frame.<br>Bottom half-frame is built with the odd lines of the corresponding full-frame. |
| 6 | Each component plane of the decoded frames contains a top-and-bottom packing arrangement of corresponding planes of two constituent frames.<br>Top half-frame is built with the odd lines of the corresponding full-frame.<br>Bottom half-frame is built with the even lines of the corresponding full-frame. |
| 7 | Each component plane of the decoded frames contains a top-and-bottom packing arrangement of corresponding planes of two constituent frames.<br>Top half-frame is built with the odd lines of the corresponding full-frame.<br>Bottom half-frame is built with the odd lines of the corresponding full-frame. |

A hdr_frame_compatible_type of 0 corresponds to the scheme using two LDR views; a hdr_frame_compatible_type of 1 corresponds to the scheme using a LDR view and an exposure map; a hdr_frame_compatible_type of 2 corresponds to the scheme using a LDR view on one half frame, one under-exposed LDR view on one quarter frame and one over-exposed LDR view on one quarter frame. hdr_frame_compatible_type higher than 2 can indicate use of more than three LDR images.

over_exposed_view_mapping specifies which half frame is mapped with the over-exposed LDR view. This flag is present when hdr_frame_compatible_type equals 0 or 2.

When hdr_frame_packing_arrangement_type is in the range 0 to 3 (Side-by-side arrangement):
over_exposed_view_mapping equal to 0 indicates that the over-exposed LDR view is mapped on the left half-frame and so that the under-exposed LDR view is mapped on the right half-frame.
over_exposed_view_mapping equal to 1 indicates that the over-exposed LDR view is mapped on the right half-frame and so that the under-exposed LDR view is mapped on the left half-frame.

When hdr_frame_packing_arrangement_type is in the range 4 to 7 (Top-and-bottom arrangement):
over_exposed_view_mapping equal to 0 indicates that the over-exposed LDR view is mapped on the top half-frame and so that the under-exposed LDR view is mapped on the bottom half-frame.
over_exposed_view_mapping equal to 1 indicates that the over-exposed LDR view is mapped on the bottom half-frame and so that the under-exposed LDR view is mapped on the top half-frame.

ldr_view_mapping specifies which half frame is mapped with the LDR view. This flag is present when hdr_frame_compatible_type equals 1.

When hdr_frame_packing_arrangement_type is in the range 0 to 3 (Side-by-side arrangement):
ldr_view_mapping equal to 0 indicates that the LDR view is mapped on the left half-frame and so that the exposure map is mapped on the right half-frame.
ldr_view_mapping equal to 1 indicates that the LDR view is mapped on the right half-frame and so that the exposure map is mapped on the left half-frame.

When hdr_frame_packing_arrangement_type is in the range 4 to 7 (Top-and-bottom arrangement):
ldr_view_mapping equal to 0 indicates that the LDR view is mapped on the top half-frame and so that the exposure map is mapped on the bottom half-frame.
ldr_view_mapping equal to 1 indicates that the LDR view is mapped on the bottom half-frame and so that the exposure map is mapped on the top half-frame.

hdr_luminance_min gives the min value of the luminance ratio between the HDR frame and the corresponding LDR frame before normalization. This 16-bits value shall be interpreted as half-float value (IEEE 754 representation).

hdr_luminance_max gives the max value of the luminance ratio between the HDR frame and the corresponding LDR frame before normalization. This 16-bits value shall be interpreted as half-float value (IEEE 754 representation).

luminance_ratio_scaling_method specifies the method used to compress the luminance ration ratio values.

A luminance_ratio_scaling_method of 0 corresponds to linear scaling.

A luminance_ratio_scaling_method of 1 corresponds to a log 2 scaling.

A luminance_ratio_scaling_method of 2 corresponds to log 10 scaling.

multi_view_mapping specifies which half frame is mapped with the normally exposed LDR view and which quarter frame maps the under-exposed and over-exposed LDR views. This flag is only present when hdr_frame_compatible_type equals 2.

When hdr_frame_packing_arrangement_type is in the range 0 to 3 (Side-by-side arrangement):
multi_view_mapping equal to 0 indicates that the normally exposed LDR view is mapped on the left half-frame, the under-exposed LDR view is mapped on the right and top quarter-frame and the over-exposed LDR view is mapped on the right and bottom quarter-frame.
multi_view_mapping equal to 1 indicates that the normally exposed LDR view is mapped on the left half-frame, the over-exposed LDR view is mapped on the right and top quarter-frame and the under-exposed LDR view is mapped on the right and bottom quarter-frame.
multi_view_mapping equal to 2 indicates that the normally exposed LDR view is mapped on the right half-frame, the under-exposed LDR view is mapped on the left and top quarter-frame and the over-exposed LDR view is mapped on the left and bottom quarter-frame.

multi_view_mapping equal to 3 indicates that the normally exposed LDR view is mapped on the right half-frame, the over-exposed LDR view is mapped on the left and top quarter-frame and the under-exposed LDR view is mapped on the left and bottom quarter-frame.

When hdr_frame_packing_arrangement_type is in the range 4 to 7 (Top-and-bottom arrangement):

multi_view_mapping equal to 0 indicates that the normally exposed LDR view is mapped on the top half-frame, the under-exposed LDR view is mapped on the bottom and left quarter-frame and the over-exposed LDR view is mapped on the bottom and right quarter-frame.

multi_view_mapping equal to 1 indicates that the normally exposed LDR view is mapped on the top half-frame, the over-exposed LDR view is mapped on the bottom and left quarter-frame and the under-exposed LDR view is mapped on the bottom and right quarter-frame.

multi_view_mapping equal to 2 indicates that the normally exposed LDR view is mapped on the bottom half-frame, the under-exposed LDR view is mapped on the top and left quarter-frame and the over-exposed LDR view is mapped on top and right quarter-frame.

multi_view_mapping equal to 3 indicates that the normally exposed LDR view is mapped on the bottom half-frame, the over-exposed LDR view is mapped on the top and left quarter-frame and the under-exposed LDR view is mapped on the top and right quarter-frame.

secondary_down_sample_mapping specifies the way the secondary down-sampling method is applied, i.e. which lines or columns (even or odd) are used. This flag is present when hdr_frame_compatible_type equals 2 only.

When hdr_frame_packing_arrangement_type is in the range 0 to 3 (Side-by-side arrangement) the column selection for the horizontal sub-sampling is already specified by the hdr_frame_packing_arrangement_type value.

secondary_down_sample_mapping equal to 0 indicates that the even lines are used for both the over-exposed and the under-exposed LDR views for the vertical sub-sampling.

secondary_down_sample_mapping equal to 1 indicates that the odd lines are used for both the over-exposed and the under-exposed LDR views for the vertical sub-sampling.

When hdr_frame_packing_arrangement_type is in the range 4 to 7 (Top-and-bottom arrangement) the line selection for the vertical sub-sampling is already specified by the hdr_frame_packing_arrangement_type value.

secondary_down_sample_mapping equal to 0 indicates that the even columns are used for both the over-exposed and the under-exposed LDR views for the horizontal sub-sampling.

secondary_down_sample_mapping equal to 1 indicates that the odd columns are used for both the over-exposed and the under-exposed LDR views for the horizontal sub-sampling.

The invention allows HDR distribution using already deployed solutions (standards HDTV systems).

The invention further allows for efficient and scalable encoding of HDR data with a retro-compatibility with standards HDTV systems.

This invention is flexible as it has the ability to adapt to many displays technologies.

The invention is applicable in the field of HDR video encoding/decoding for distribution and/or storage.

The invention may concern both the video representation format, the video distribution chain and the receiver (set-top box, decoder, PVR) or display devices.

The invention claimed is:

1. A method of encoding a high dynamic range (HDR) image of high dynamic range, comprising:
   obtaining three low dynamic range (LDR) images, each of said three LDR images providing a lower dynamic range depiction of the HDR image content, one of the three LDR images being normally-exposed, one of the three LDR images being over-exposed and one of the three LDR images being under-exposed;
   adjusting said under-exposed LDR image and said over-exposed LDR image by using a histogram alignment to improve the exposures of said under-exposed and over-exposed LDR images in a way which preserves details in normally exposed areas of each of said under-exposed and over-exposed LDR images;
   down-sampling said normally-exposed LDR image and said adjusted under exposed and over-exposed LDR images;
   arranging, in a frame, the down-sampled normally-exposed LDR image and additional data comprising the down-sampled under-exposed and over-exposed LDR images, wherein said down-sampled under-exposed and over-exposed LDR images are arranged side-by-side when the additional data and said down-sampled normally-exposed LDR image are arranged top-and-bottom, and the down-sampled under-exposed and over-exposed LDR images are arranged top-and-bottom when the additional data and the down-sampled normally-exposed LDR image are arranged side-by-side; and
   encoding the frame.

2. The method of claim 1, wherein down-sampling information is encoded in metadata of the frame, the down-sampling information indicating at least one of: whether odd lines have been removed in the down-sampled normally-exposed LDR image and whether odd lines have been removed in the down-sampled additional data under-exposed and over-exposed LDR images.

3. The method of claim 1, wherein arrangement information is encoded in metadata of the frame, the arrangement information indicating how the down-sampled normally-exposed LDR image and additional data are arranged in the frame and wherein:
   down-sampling is horizontal and arrangement is side-by-side; or
   down-sampling is vertical and arrangement is top- and bottom.

4. The method of claim 1, wherein at least one parameter of the histogram alignment is encoded as a metadata in the frame.

5. A method of reconstructing a high dynamic range (HDR) image, comprising
   decoding a frame;
   splitting the frame into three low dynamic range (LDR) images, each of said three LDR images providing a lower dynamic range depiction of the HDR image content, one of the three LDR images being normally-exposed, one of the three LDR images being over-exposed and one of the three LDR images being under-exposed, an additional data comprising said under-exposed and over-exposed LDR images, wherein said over-exposed and under-exposed LDR images are arranged side-by-side when the the additional data and the normally-exposed LDR image are arranged top-and-bottom, and wherein the under-exposed and over-exposed LDR images are arranged top-and-bottom when the additional data and the normally-exposed LDR image are arranged side-by-side;

up-sampling said normally-exposed LDR image and said under-exposed and over-exposed LDR images;

applying an inverse histogram alignment to the up-sampled under-exposed LDR image and the upsampled over-exposed LDR image; and reconstructing the HDR image from the up-sampled normally-exposed LDR image and the additional data comprising the adjusted up-sampled under-exposed and over exposed LDR images;

said inverse histogram alignment being a process which is the inverse of a histogram alignment intended to improve the exposures of said under-exposed and over-exposed LDR images in a way which preserves details in normally exposed areas of each of said under-exposed and over-exposed LDR images.

6. The method of claim 5, wherein at least one parameter of the inverse histogram alignment is obtained by decoding a metadata in the frame.

7. A non-transitory storage medium carrying an encoded frame comprising a down-sampled normally-exposed low dynamic range (LDR) image and down-sampled under-exposed and over-exposed LDR images allowing for reconstructing a high dynamic range (HDR) image providing a higher dynamic range depiction of the normally-exposed LDR image content, wherein an additional data comprising said under-exposed and over-exposed LDR images, the over-exposed and under-exposed LDR images are arranged side-by-side when additional data and the normally-exposed LDR image are arranged top-and-bottom, and wherein the under-exposed and over-exposed LDR images are arranged top-and-bottom when the additional data and the normally-exposed LDR image are arranged side-by-side.

8. A device for encoding a high dynamic range (HDR) image, comprising a processor configured to:

obtain three low dynamic range (LDR) images, each of said three LDR images providing a lower dynamic range depiction of the HDR image content, one of the three LDR images being normally-exposed, one of the three LDR images being over-exposed and one of the three LDR images being under-exposed;

adjust said under-exposed LDR image and said over-exposed LDR image by using a histogram alignment in order to improve the exposures of said under-exposed and over-exposed LDR images in a way which preserves details in normally exposed areas of each of said under-exposed and over-exposed LDR images;

down-sample said normally-exposed LDR image and said adjusted under-exposed and over-exposed LDR images;

arrange, in a frame, the down-sampled normally-exposed LDR image and additional data comprising the down-sampled under-exposed and over-exposed LDR images, wherein the said down-sampled under-exposed and over-exposed LDR images are arranged side-by-side when the additional data and the down-sampled normally-exposed LDR image are arranged top-and-bottom, and said down-sampled under-exposed and over-exposed LDR images are arranged top-and-bottom when the additional data and the down-sampled normally-exposed LDR image are arranged side-by-side; and encode the frame.

9. The device of claim 8, wherein down-sampling information is encoded in metadata of the frame, the down-sampling information indicating at least one of: whether odd lines have been removed in the down-sampled normally-exposed LDR image and whether odd lines have been removed in the down-sampled additional data under-exposed and over-exposed LDR images.

10. The device of claim 8, wherein arrangement information is encoded in metadata of the frame, the arrangement information indicating how the down-sampled normally-exposed LDR image and-additional data are arranged in the frame and wherein:

down-sampling is horizontal and arrangement is side-by-side or down-sampling is vertical and arrangement is top- and bottom.

11. A device for reconstructing a high dynamic range (HDR) image, comprising a processor configured to:

decode a frame, split the frame into three low dynamic range (LDR) images, each of said three LDR images providing a lower dynamic range depiction of the HDR image content, one of the three LDR images being normally-exposed, one of the three LDR images being over-exposed and one of the three LDR images being under-exposed, an additional date comprising said under-exposed and over-exposed LDR images, wherein said over-exposed and under-exposed LDR images are arranged side-by-side when the additional data and the normally-exposed LDR image are arranged top-and-bottom, and wherein the under-exposed and over-exposed LDR images are arranged top-and-bottom when the additional data and the normally-exposed LDR image are arranged side-by-side;

up-sample said normally exposed LDR image and said under-exposed and over exposed LDR images;

apply an inverse histogram alignment to the up-sampled under-exposed LDR image and the up-sampled over-exposed LDR image; and reconstruct the HDR image from the up-sampled normally-exposed and an additional data comprising the adjusted up-sampled under-exposed and over-exposed LDR images;

said inverse histogram alignment being a process which is inverse of a histogram alignment intended to improve the exposures of an under-exposed and over-exposed LDR images in a way which preserves details in normally exposed areas of each of said under-exposed and over-exposed LDR images.

12. The device of claim 11, wherein at least one parameter of the inverse histogram alignment is obtained by decoding a metadata in the frame.

* * * * *